Oct. 9, 1934.  J. C. OLSEN  1,976,458
HINGED FASTENING
Filed Jan. 15, 1934   3 Sheets-Sheet 1
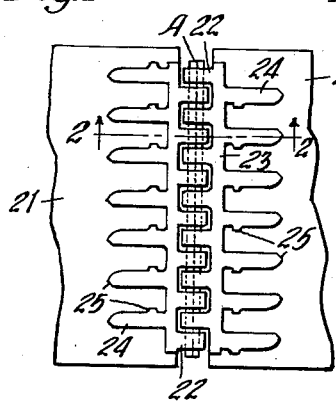
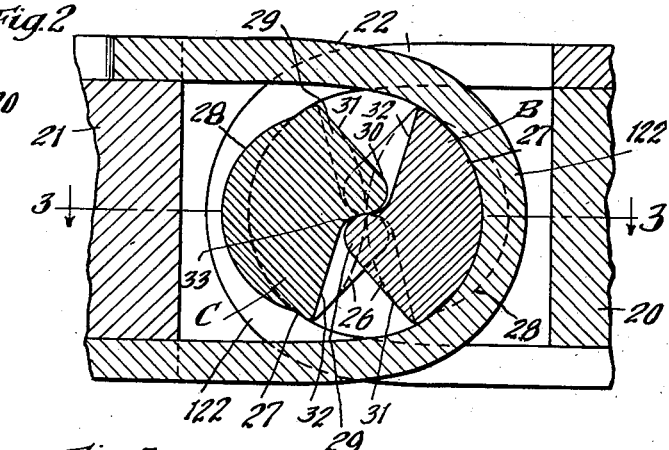
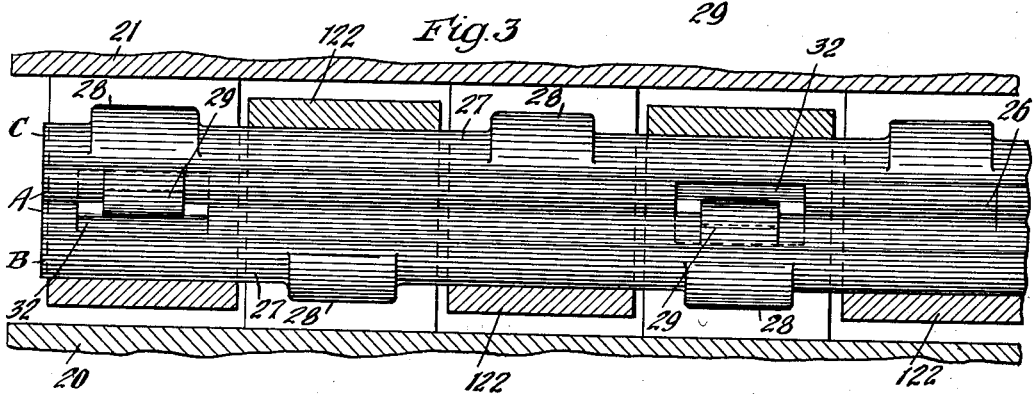
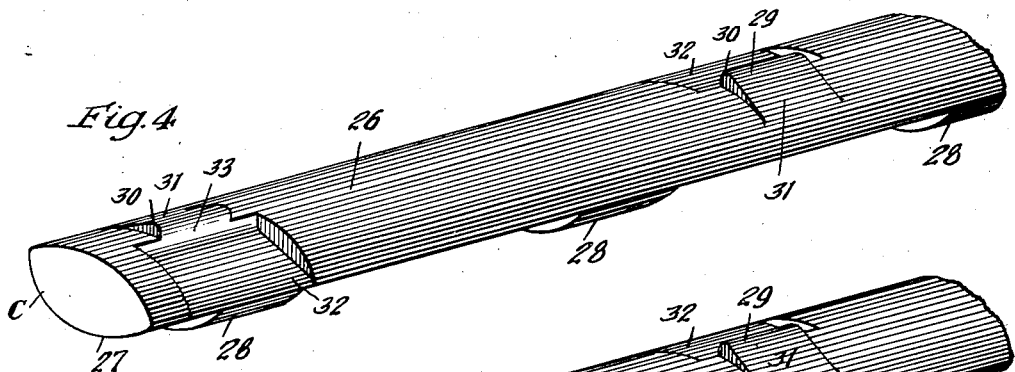
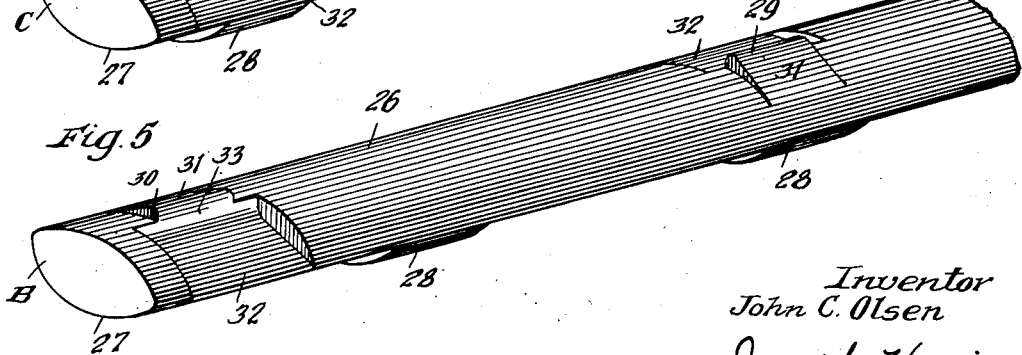
Inventor
John C. Olsen
By Joseph Harris
His Atty.

Oct. 9, 1934.  J. C. OLSEN  1,976,458
HINGED FASTENING
Filed Jan. 15, 1934   3 Sheets-Sheet 2
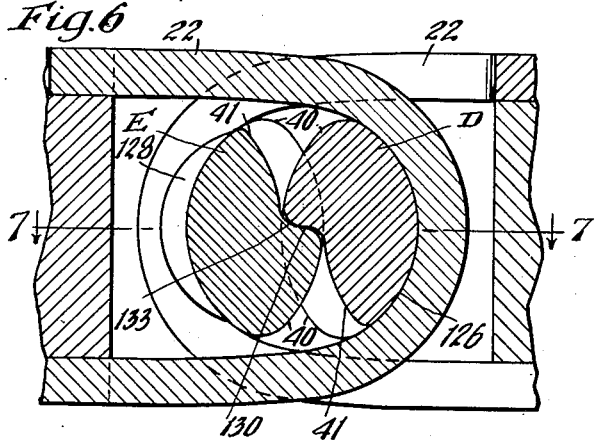
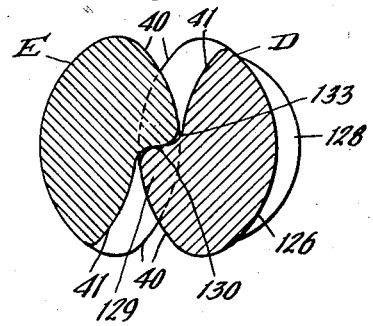
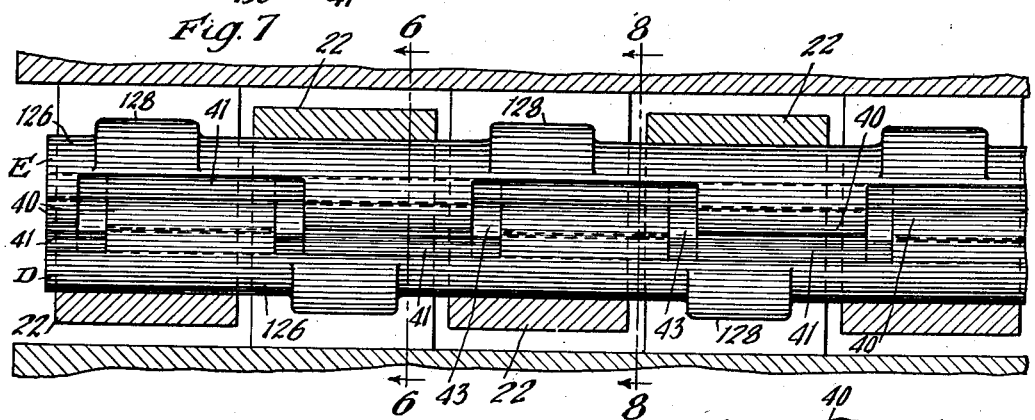
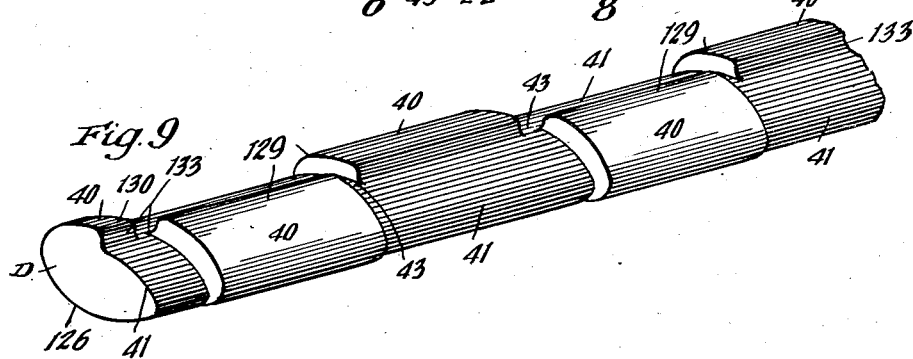
Inventor
John C. Olsen
By Joseph Harris
His Atty.

Oct. 9, 1934.    J. C. OLSEN    1,976,458
HINGED FASTENING
Filed Jan. 15, 1934    3 Sheets-Sheet 3
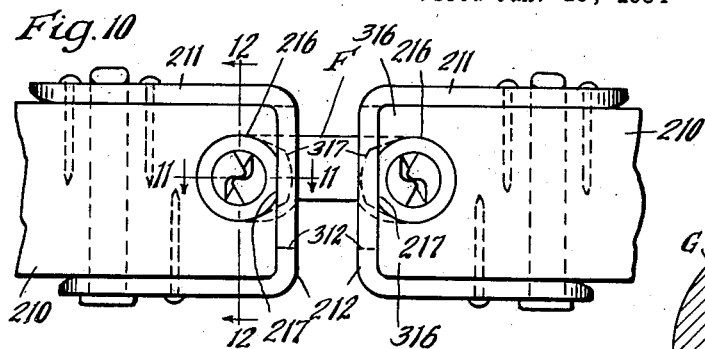
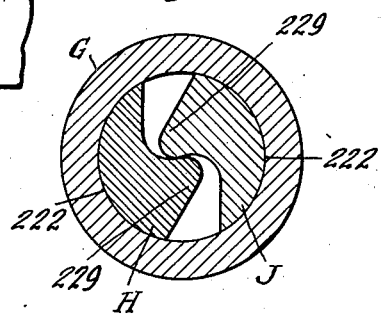
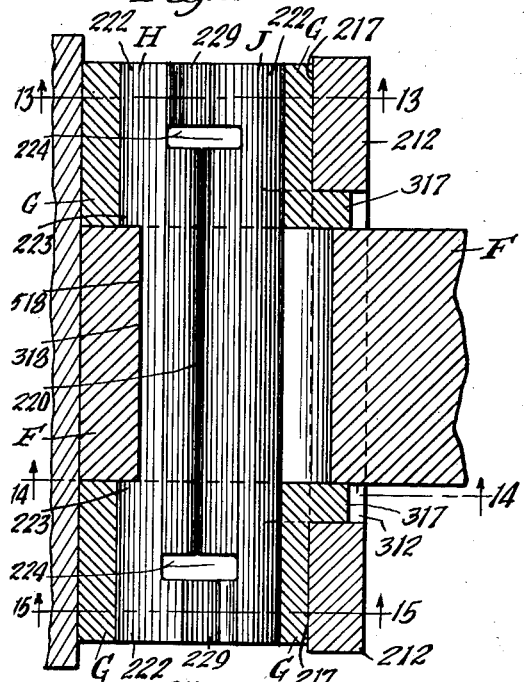
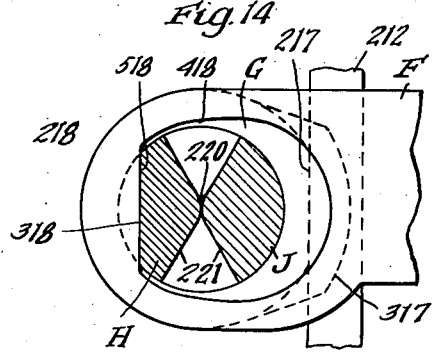
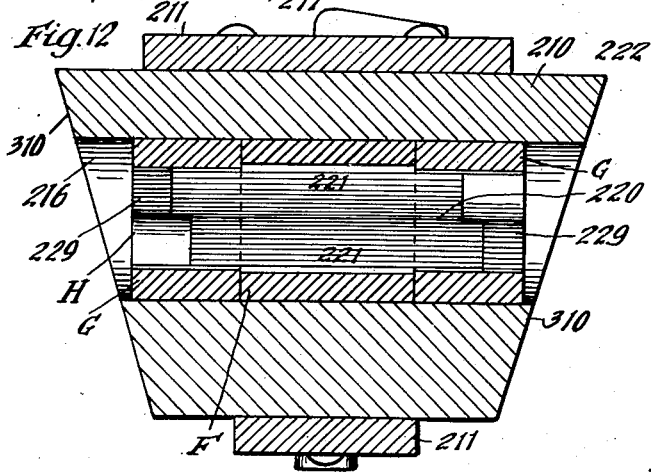
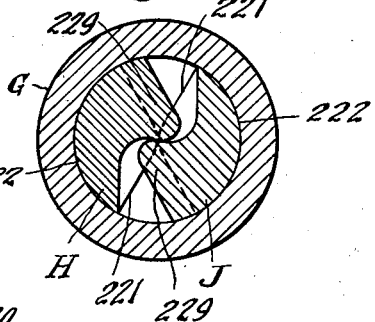
Inventor
John C. Olsen
By Joseph Harris
His Atty.

Patented Oct. 9, 1934

1,976,458

UNITED STATES PATENT OFFICE

1,976,458

HINGED FASTENING

John C. Olsen, Chicago, Ill., assignor to Flexible Steel Lacing Company, Chicago, Ill., a corporation of Illinois Application January 15, 1934, Serial No. 706,657

17 Claims. (Cl. 24—33)

This invention relates to improvements in hinged fastening.

As is well known to those skilled in the art, serious difficulties have heretofore been encountered in flexible or hinged types of fastenings for machinery belts, conveyor belts, link chains and other like flexible power transmitters due to rapid wear on the hinge pins and associated parts. Such rapid wear is due principally to the constant turning or pivotal action necessitated in passing around the pulleys or wheels and to what is known as the "whipping" action which takes place each time the power transmitter is deflected from the straight or tangent line of travel to the circular line of travel and which, in the case of sectional hinge pins, produces relative slippage, scuffing or sliding of the sections on each other.

One object of this invention is to provide an improved sectional hinge pin for belt or like fastenings, sprocket chains and other power transmitters wherein the pin sections have constant true rolling engagement with each other within the permissible range of movements under service conditions and wherein also cooperable and oppositely disposed sets of overlapping integral formations of epicycloidal character also have continuous rolling engagement with each other to thereby prevent scuffing or relative sliding or shifting of the pin sections in a direction transverse to the general plane of the tension on the power transmitter and hence, to minimize wear and prolong the life of the pin and associated parts.

Another object of the invention is to provide a sectional hinge pin wherein the pin sections or elements have an approximately true rocking or pivotal action, the constancy of which is maintained by similar integral formations formed on the pin sections.

Still another object of the invention is to provide a sectional hinge pin of the character indicated in the preceding paragraph wherein both sections or elements are of like form, to the end that the manufacturing cost may be reduced to a minimum; wherein the sectional hinge pin may be readily adapted for use with interdigitated loop types of fastenings for belt ends; and wherein, in certain types, the hinge pin sections may be originally formed of any desired length and thereafter cut or broken off to shorter lengths for use with belts of differing widths and, as used in any length, may readily be inserted in place or removed without danger when in place, from becoming accidentally displaced.

Other objects of the invention will more clearly appear from the description and claims hereinafter following.

In the drawings forming a part of this specification, Figure 1 is a top plan view of portions of adjacent ends of a belt showing one embodiment of the improved hinge pin and fastening applied thereto. Figure 2 is a vertical, sectional view upon an enlarged scale, corresponding substantially to the line 2—2 of Figure 1. Figure 3 is a horizontal, sectional view corresponding substantially to the line 3—3 of Figure 2. Figures 4 and 5 are detailed perspective views of the two elements or sections of the improved hinge pin shown in the preceding figures, the relation of the two elements shown in Figures 4 and 5 being such that, upon turning of the element shown in Figure 4, through an angle of 180° and then moving the same toward the element shown in Figure 5, the two elements will then be in complemental relation and constitute the complete pin. Figure 6 is a view similar to Figure 2 illustrating another embodiment of the invention, the section of Figure 6 corresponding to the section line 6—6 of Figure 7. Figure 7 is a horizontal, sectional view corresponding to the section line 7—7 of Figure 6. Figure 8 is a transverse, sectional view of the sectional hinge pin shown in Figures 6 and 7 and corresponding to the section line 8—8 of Figure 7. Figure 9 is a detailed perspective of one of the pin sections shown in Figures 6, 7 and 8. Figure 10 is a side elevational view of still another embodiment of the invention shown as applied to the fasteners for the ends of a V-belt. Figure 11 is an enlarged horizontal sectional view corresponding to the section line 11—11 of Figure 10. Figure 12 is a vertical, transverse, sectional view corresponding to the line 12—12 of Figure 10. And Figures 13, 14 and 15 are vertical, sectional views corresponding respectively to the section lines 13—13, 14—14, and 15—15 of Figure 11.

Referring first to the construction illustrated in Figures 1 to 5, the adjacent ends of the belt or other power transmitter there shown are indicated at 20 and 21, to each of which is secured a fastening proper. Each of the fasteners proper chosen for illustration and which is of a well known type, consists of a series of spaced loops 22—22, all integrally united by connecting strips 23 and with which are integrally formed laterally spaced and oppositely extending inner and outer sets of tangs 24—24, having the usual clinching prongs 25 imbedded in the belt material. The two sections of fasteners proper or belt lacing are so arranged that the respective loops thereof are alternated or interdigitated in the customary manner so as to bring the loops into alinement transversely of the belt for the reception of the hinge pin designated generally by the reference character A. As will be understood by those skilled in the art, various other forms of loop type of fastening may be employed without departing from the spirit of the invention.

The improved hinge pin comprises two preferably like sections or elements B and C. Each said element is provided on its inner face, that is, the face which is brought opposite the cooperating element, with convexly curved rolling bearing surfaces 26 extending lengthwise of the element. Said surfaces 26, when the two elements are assembled as best shown in Figure 2, are obviously adapted to have true rolling line contact on each other to both sides of the neutral or normal central line of engagement as shown in Figure 2.

On its opposite or outer side, each pin element is provided with a plurality of convex bearing seats 27—27 alternated, lengthwise of the element, with spacing outwardly extended lugs or projections 28—28. The bearing seats 27 are made of such contour and size as to snugly fit or seat within the rounded apices 122 of one set of loops and are correspondingly spaced. The spacing lugs 28 are so located and of such width, lengthwise of the element, as to be positioned between each pair of loops of the fastener proper within which the corresponding element is seated, as above described. In actual practice, the seats 27 will be slightly longer than the width of each loop and the lugs 28 preferably slightly shorter than the width of the loops so as to provide a small amount of clearance when the assembled pin is in operative position and prevent undue wear. As will be evident, when the assembled pin elements are in place and properly seated with respect to the loops of the fastenings, the pin is restrained against accidental displacement in a direction lengthwise of the pin.

Also on its inner face, each element B and C is provided with longitudinally spaced formations, hereinafter specifically described, alternated with the rolling bearing surfaces 26. Each of said formations, as best shown in Figures 2, 4 and 5, consists of a longitudinally extending rib or protuberance 29 having a rounded edge 30 and from the base of which rib substantially flat surfaces 31 and 32 diverge toward the outer or opposite side of the element. Each flat surface 31 is preferably made substantially tangent to the rounded surface 30 and each flat surface 32, which is disposed below the plane of the rolling bearing surfaces 26, is united to the curved surface of the rib by an ogee curved surface 33, the center of the ogee curved surface coinciding with the line of bearing contact between the sets of bearing surfaces 26, when the pin elements are in their normal or neutral position corresponding to a straight pull on the belt and as shown in Figure 2. Said formations on each of the pin elements are alternately oppositely disposed, as best indicated in Figures 4 and 5, and it will be noted that, in the normal or neutral position of the pin elements as shown in Figure 2, the rib 29 of the element B as shown in that particular section, is disposed below a horizontal plane passing through the belt and the corresponding rib 29 of the other pin element C is above said plane. In actual practice, the surfaces 31, 30, 33 and 32 of each of said formations are so generated in the nature of an epicycloidal, that a line of rolling contact will be maintained between the cooperating sets of formations of the two elements in any relative angular position of the two elements on their bearing surfaces 26. As evident from Figure 2, the cooperating overlapping formations shown in that section will prevent the pin element C from shifting downwardly relatively to the pin section B. Correspondingly, the next set of said formations lengthwise of the pin and which is arranged oppositely, will prevent the pin section C from moving upwardly relative to the pin section B, within any normal range of movement of the flexible connection. Preferably, the cooperating sets of rib formations will correspond in frequency to the number of rolling bearing surfaces 26 and, in actual practice, each rib 29 will be made of somewhat lesser width, considered lengthwise of the pin element, than the corresponding depressed portion of the adjacent pin element within which it works, as clearly shown in Figures 4 and 5 so as to provide limited tolerance in the relative longitudinal positions between the pin elements and prevent excessive wear on the end faces of the ribs and depressions.

With the pin elements formed and cooperating as hereinbefore described, it is evident that the pin sections are prevented against relative shift or slippage in a direction perpendicular to the normal plane of the belt or line of tension and that the two pin elements are confined to a true rolling contact on each other. Further, it will be evident that the restraint placed on the two pin elements against such slippage or scuffing, by the overlapping cooperating rib formations, is accomplished in such manner as to minimize wear on these formations since the engagement therebetween, due to the manner of generating the surfaces, is always that of rolling line contact in all positions. It is further evident that by constructing the pin sections in the manner shown and described, only one set of dies or rolls is required for a given size since two lengths of the same pin section may be used to cooperate with each other by turning the same into operative relation, as apparent from Figures 4 and 5, thus keeping the manufacturing cost down to a minimum. By preventing the relative shift or slippage of the pin elements as above described, it is evident that the whipping action will be eliminated since neither pin section can be thrown out by centrifugal force so as to strike the inner surfaces of the loops of the fasteners proper.

Referring next to the construction illustrated in Figures 6 to 9, the two pin elements D and E there shown, are of the same general character as the pin A and are adapted to be used with a similar belt fastening or lacing having interdigitated loops 22—22. In this construction, however, the actual rolling bearing faces and the integral formations to prevent relative slippage or scuffing are combined.

Each of the pin elements E and D is provided on its inner face with a series of convex or curved bearing faces 40 and 41, each of the same curvature but offset from each other considered in a direction lengthwise of the belt. Referring to the particular sections shown at Figure 8, the bearing face 40 of the element D may be said to be outwardly offset relative to the surface 41. The formation is such that the projecting or outstanding portion of the pin element D, on which is formed the rolling bearing surface 40, constitutes a rib 129, similar to the rib 29 of the first described form, said rib 129 having a rounded bearing edge 130 and united to the bearing surface 41 by an ogee curved surface 133. As clearly shown in Figure 9, the outwardly extending or protruding rib and bearing formations 40 and 129 are alternated, lengthwise of the pin element, with the depressed rolling bearing surfaces 41 at each side of the median plane passing through the pin element. Those outwardly extending or protruding formations 40—129, which are at one side of said median plane, are staggered with respect to those on the other side of the median plane so that, in transverse section, a protruding formation 40—129 will be alined with a depressed bearing surface 41 but the arrangements will be reversed at different sections taken along the pin. All of the bearing surfaces 40—41 and 133 are generated in the same manner as described in connection with the form of pin shown in Figures 1 to 5, that is, in the nature of epicycloidal surfaces so that, when the two pin elements are assembled as best shown in Figures 6 and 8, the rib formations will not only be in bearing contact with each other but will overlap in oppositely arranged sets lengthwise of the pin. As viewed in Figure 6, the cooperating formations are such as to prevent the pin element E from moving upwardly relative to the element D and, in those sections represented by Figure 8, the formations are such as to prevent the element E from moving downwardly relative to the element D, thereby preventing relative shift or slippage or scuffing as will be apparent. In the normal or neutral position of the pin elements, the lines of contact coincide with the points of intersection of two lines at right angles to each other, one perpendicular to the plane of the belt and passing midway between the elements and the other line horizontally and midway between the top and bottom of the pin elements. Assuming the pin element E to remain in the plane of the moving belt and the element D to roll or swing angularly upwardly with reference thereto, it is evident that the lines of contact between the formations as illustrated in Figure 8 will progressively pass around the surface of the rib 130 of the element E, the lines of contact being effected with the surface 41. In the same movement and referring to those portions of the pin represented by the section of Figure 6, the lines of rolling contact will move over the surface of the rib formation 130 of the element D and the bearing surface 41 of the element E. Conversely, if the element D is swung downwardly relative to the element E, the lines of bearing contact will take place on the corresponding surfaces below the horizontal median plane.

In actual practice, the width of each protruding portion 40—129, considered lengthwise of the pin element, will be made somewhat less than the width, also considered lengthwise of the element, of the corresponding alined depressed bearing surface 41, as shown in Figure 9, thus leaving small spaces or gaps 43 between adjacent ends of the staggered outwardly offset portions 40—129 so as to provide a certain degree of tolerance and eliminate frictional wear on the end surfaces of the offset portions 40 during the rolling movements of the elements. For use with a belt lacing or fastener of the interdigitated loop type, the spacing of the inter-engaging formations will correspond to the spacing of the loops and the pin elements will preferably be provided on their outer sides with alternated bearing seats and spacer lugs 126 and 128 as in the first described form.

As will be apparent from the proceeding description, the same advantages are obtained in the form of pin shown in Figures 6 to 9 as in the case of the first described form with a somewhat increased total area of active bearing load-transmitting surfaces on the opposed inner faces of the two pin elements. Also, as in the case of the first described pin, both elements of that of Figures 6 to 9 are of like construction and may be made with a single set of dies or rolls and cut or broken to any desired lengths.

Referring next to the embodiment of the invention shown in Figures 10 to 15, 210—210 denote the adjacent ends of a V-belt (ordinarily comprised of rubber and imbedded fabric), with the upper face appreciably wider than the lower or inner face and having inwardly or downwardly converging side walls 310—310 adapting the belt to run on groove pulleys. The improved fastener, as shown, comprises a pair of horizontally disposed U or bail-like members 211—211 with bights 212 centrally apertured to accommodate therein a connecting link or tension member F. The bail members 211 are or may be of the same form and attached in the same manner as shown and described in John C. Olsen Patent 1,970,618, granted August 21, 1934, to which reference may be had for a more detailed description.

Prior to the attachment of the bail members 211, each belt end will be prepared by boring out an approximately cylindrical opening 216 extending transversely through the belt end and in line with the neutral axis of the belt, said openings being for the accommodation of the bearing elements G and improved rocker pins hereinafter described. Each of the bearing elements G, of which two are associated with each bail member 211, preferably comprises a cylindrical sleeve or ring partially cut off to provide a flat bearing surface 217 to non-rotatably bear against the bight of the bail member. Each bearing element is additionally formed with a shallow lip or flange 317 entering within and bearing against the side edge of the bight opening 312. The bearing members G are of such dimension, axially, that the same may be successively entered through the bight openings 312 and then shifted laterally into proper position as best shown in Figure 11, and when in position leave sufficient space therebetween to enter the ends of the link F, as shown, all as more fully described in said application 690,182.

The link F, only one of which will preferably be employed in a V-belt arrangement but the number of which may be increased in the case of wider belts or chains, is of elongated form as shown in Figure 10, with more or less oval ends 218, each of the latter being provided with a specially shaped aperture. Each said aperture is defined at the end nearest the corresponding end of the link by a vertically extending flat bearing surface 318 with the remainder of the aperture of approximately oval contour, as indicated at 418, the entire aperture being of sufficient extent to permit free angular movement of the link with reference to the rocker pin, hereinafter described. The link also is of such thickness as to snugly fill the spaces between the pairs of bearing elements G when the latter are in position and of such dimension vertically as to normally engage the upper and lower lips 316 of the belt material left by the transverse openings 216.

The improved rocker pin consists of two sections or elements H and J. Each of said elements H and J, for the greater part of its length, is provided on its inner face and centrally thereof with a rounded bearing fulcrum edge 220 from which extend tangentially and diverging toward the outer face of each pin element, two preferably flat surfaces 221—221. The line of contact between the two rocker bearing edges 220 coincides with the axis of the bearing elements G and the same function substantially as a fulcrum or pivotal connection. By slightly rounding the bearing edges 220, a sharp knife edge fulcrum with its inherent tendency to wear down rapidly, is avoided while retaining, however, the desired fulcruming action about a substantially fixed line or center.

Intermediate its ends and in line with the link, the pin element H is recessed or cut away so as to provide a flat bearing surface 518 to non-rockably or rotatably cooperate with the alined flat bearing face 318 of the link and thus insure unison of movement of the pin element H with any movement of the link.

At their ends and within the bearing elements G, the pin elements H and J are formed with outer curved bearing surfaces 222 struck on the same radius as the radius of the interior bearings of the bearing elements G so that the relative angular movements between the pin elements H and J are restricted to movement about the axis of the bearing elements.

At each end, the pin elements H and J are provided with cooperable but oppositely disposed sets of integral rib formations 229—229 similar to those of the pin illustrated in Figures 1 to 5 and having the same purpose and function, that is, to prevent relative slippage or scuffing between the pin elements during operation.

Referring to Figure 11, it will be noted that the pin element H is prevented from moving endwise relative to the link F by reason of the shoulders 223 formed at the ends of the flat bearing seat 518. By reason of the shoulders formed at the inner ends of the rib formations 229 where the cross section of the pin elements changes to the central cross sections 220—221, the two pin elements H and J are prevented from shifting longitudinally relative to each other when in assembled position, except for such predetermined clearance or tolerance indicated at 224—224, which is greatly exaggerated in the scale of the drawing of Figure 11. To insert the sectional rocker pin H—J, the link F, as viewed in Figure 11, is pushed to the left into the material of the belt so that the bearing seat 318 of the link is either flush or outside of the bearing surface of the bearing elements G, thus permitting the insertion of the assembled pin sections H and J, whereupon the link F is released or pulled to the right so as to engage the flat bearing seats 318 and 518 of the link and pin element H. The pin may be removed by reversing the steps just described.

With the arrangement shown in Figures 10 to 15, it is evident that a substantially true rocking or pivotal action always about the same center or axis is obtained and, at the same time, relative displacement between the pin elements H and J within the bearing elements G is prevented, thus insuring longer life and wear to the connection.

Although there has herein been shown and described what is now considered the preferred manner of carrying out the invention, nevertheless the same is by way of illustration. Various changes and modifications may obviously be made without departing from the spirit of the invention and all such changes and modifications are contemplated that come within the scope of the claims appended hereto.

What is claimed is:

1. As an article of manufacture, a hinge pin for a flexible connection of a power transmitter, said pin comprising two elements adapted for bearing contact with each other on lines extending lengthwise of the pin, said elements having oppositely disposed sets of cooperable formations at points therealong, each set comprising, as the assembly of the two elements are viewed in transverse section, a rib-like protuberance on each element, with a rounded edge and surfaces diverging from the base thereof, the rib-like protuberances of each set overlapping in all angular positions of the elements within the working limits of the pin and preventing relative bodily slippage of the two pin elements transverse to the line of tension on the power transmitter.

2. A hinge pin in accordance with claim 1 wherein both of the elements are of like construction.

3. As an article of manufacture, a hinge pin of the character described comprising two elements adapted for bearing contact on the opposed adjacent inner faces, each element being provided, on its said inner face, with outwardly projecting, rounded edge, rib-like formations, some of which are normally disposed principally above the remainder principally below a plane located by the lines of tension and bearing contact when the pin elements are in relatively normal position, the rib-like formations of the two elements being in overlapping contact when the two elements are operatively assembled.

4. A hinge pin in accordance with claim 3 wherein the two pin elements are of like construction.

5. As an article of manufacture, a hinge pin of the character described comprising two elements adapted for bearing contact on the opposed adjacent inner faces, each element being provided, on its said inner face, with outwardly projecting, rounded edge, rib-like formations, some of which are normally disposed principally above and the remainder principally below a plane located by the lines of tension and bearing contact when the pin elements are in relatively normal position, the rib-like formations of the two elements being in overlapping contact when the two elements are operatively assembled, each of said elements being formed on its outer face with a plurality of bearing seats and spacer lugs.

6. As an article of manufacture, a hinge pin for belt fastenings and the like, comprising: two elements adapted for rolling contact with each other on their opposed, longitudinally extending inner bearing faces, the bearing face of each element comprising two series of curved bearing surfaces, the bearing surfaces of one series being outwardly offset from those of the other series when the element is viewed in transverse section, the pairs of said relatively offset bearing surfaces being alternately, oppositely disposed lengthwise of the element, the outwardly offset bearing surfaces of one element being adapted to roll on the relatively inwardly offset bearing surfaces of the other element when the two elements are assembled in operative position.

7. A pin element for a two element hinge pin of the character described, said element having, above the longitudinally extending median plane thereof, on its inner bearing face, alternately raised and depressed curved bearing surfaces and, below said median plane, corresponding alternating raised and depressed curved bearing surfaces, the bearing surfaces below the median plane being longitudinally staggered with reference to those above said plane, each raised bearing surface being merged with the corresponding transversely ailned depressed bearing surface by an intermediate ogee curved rolling bearing surface.

8. A hinge pin in accordance with claim 6 wherein each of the elements is provided on its outer face with alternated bearing seats and spacing lugs.

9. A hinge pin in accordance with claim 6 wherein both of the pin elements are of like formation.

10. A hinge pin of the character described comprising two elements adapted for rolling contact with each other on their opposed, longitudinally extending inner faces, each element having its inner face formed with convex rolling bearing surfaces alternating, longitudinally of the element, with retaining formations, each retaining formation including a portion extending outwardly beyond the bearing surface and a portion depressed below the bearing surface, some of said retaining formations being disposed reversely of the others.

11. A hinge pin of the character described comprising two elements adapted for rolling contact with each other on their opposed, longitudinally extending inner faces, each element having its inner face formed with convex, rolling bearing surfaces alternating, longitudinally of the element, with retaining formations, each retaining formation including a portion extending outwardly beyond the bearing surface and a portion depressed below the bearing surface, alternate ones of said retaining formations being disposed reversely of the others.

12. A hinge pin for a flexible connection of a power transmitter, said pin comprising two elements having, at longitudinally spaced intervals therealong, opposed convex bearing surfaces and, intermediate said sets of bearing surfaces, cooperable complemental overlapping formations of approximately epicycloidal type adapted for rolling engagement with each other as the two elements roll on their said bearing surfaces.

13. A hinge pin in accordance with claim 12 wherein alternate sets of said formations are oppositely disposed and the two elements are of like construction.

14. A hinge pin of the character described comprising two elements adapted for rolling contact with each other on their opposed, longitudinally extending inner faces, each element having its inner face formed with convex rolling bearing surfaces alternating, longitudinally of the element, with retaining formations, each retaining formation including a portion extending outwardly beyond the bearing surface and a portion depressed below the bearing surface, some of said retaining formations being disposed reversely of the others, said elements being of like construction and each provided, on its outer face, with alternated bearing seats and spacer lugs.

15. In a flexible connection for a power transmitter, the combination of spaced members having inner bearings, of a hinge pin seated at its ends in said bearings, said pin comprising two elements having, on their opposed faces, longitudinally extending bearing surfaces adapted to rock relatively on each other, said elements having also, on their opposed faces, oppositely arranged sets of cooperable formations, each set comprising a rib-like protuberance on each element, the rib-like protuberances of each set overlapping in all angular positions of the elements and preventing relative bodily slippage of the elements transverse to the axis of rocking.

16. In a flexible connection for a power transmitter, the combination of spaced members having inner bearings, of a hinge pin seated at its ends in said bearings, said pin comprising: two elements having longitudinally extending bearing surfaces adapted to rock on each other, said elements having also retaining formations on their opposed faces, each formation including a portion extending outwardly beyond the bearing surface and a portion depressed therebelow.

17. In a fastener for the ends of a belt, the combination with a pair of bail-like attaching members each adapted to embrace one end of the belt and with the bight provided with an aperture; of means for attaching the arms of said members to the belt ends; a link extending between and through said bight apertures; bearing means engaging the inner side of each bight; and a sectional rocker pin extending through each end of the link and journaled at its ends in the corresponding bearing means, each pin comprising two elements having engaging rounded rocker bearing surfaces, said elements being provided also with oppositely disposed sets of retaining formations, each set including overlapping rib-like protuberances adapted to roll relatively to each other as the pin elements rock on their said bearing surfaces.

JOHN C. OLSEN.